United States Patent [19]

Yoshimochi

[11] Patent Number: 4,785,346

[45] Date of Patent: Nov. 15, 1988

[54] AUTOMATIC COLOR SATURATION CONTROLLER

[75] Inventor: Shigeru Yoshimochi, Shinagawa, Japan

[73] Assignee: Kabushiki Kaisha Toshiba, Kanagawa, Japan

[21] Appl. No.: 18,432

[22] Filed: Feb. 25, 1987

[30] Foreign Application Priority Data

Mar. 29, 1986 [JP] Japan .................................. 61-69750

[51] Int. Cl.⁴ .............................................. H04N 9/68
[52] U.S. Cl. ........................................ 358/27; 358/26
[58] Field of Search .................... 358/27, 26, 40, 21 R

[56] References Cited

U.S. PATENT DOCUMENTS

| 4,164,750 | 8/1979 | Hosoya | 358/26 |
| 4,415,919 | 11/1983 | Miyasako | 358/27 |
| 4,477,831 | 10/1984 | Hosoya | 358/27 |
| 4,546,377 | 10/1985 | Kasagi | 358/26 |

Primary Examiner—Tommy P. Chin
Attorney, Agent, or Firm—Foley & Lardner, Schwartz, Jeffery, Schwaab, Mack, Blumenthal & Evans

[57] ABSTRACT

An automatic color saturation controller (ACC) of synchronous detector type provides a high killer sensitivity at low field strength but a low chrominance signal stability at high field strength because the chrominance signal gain is controlled without being subjected to the influence of color burst noise. On the other hand, an ACC of peak detector type provides a high chrominance signal stability at high field strength but a low killer sensitivity at low field strength because the chrominance signal gain is directly subjected to the influence of color burst noise. In order to make the most of these two types of ACCs, the novel ACC comprises a first synchronous-detector ACC for outputting a color killer signal to a killer circuit and a second peak-detector ACC for outputting the chrominance signal to a demodulator throughout a wide field strength.

4 Claims, 3 Drawing Sheets

FIG. I(A)
(PRIOR ART)
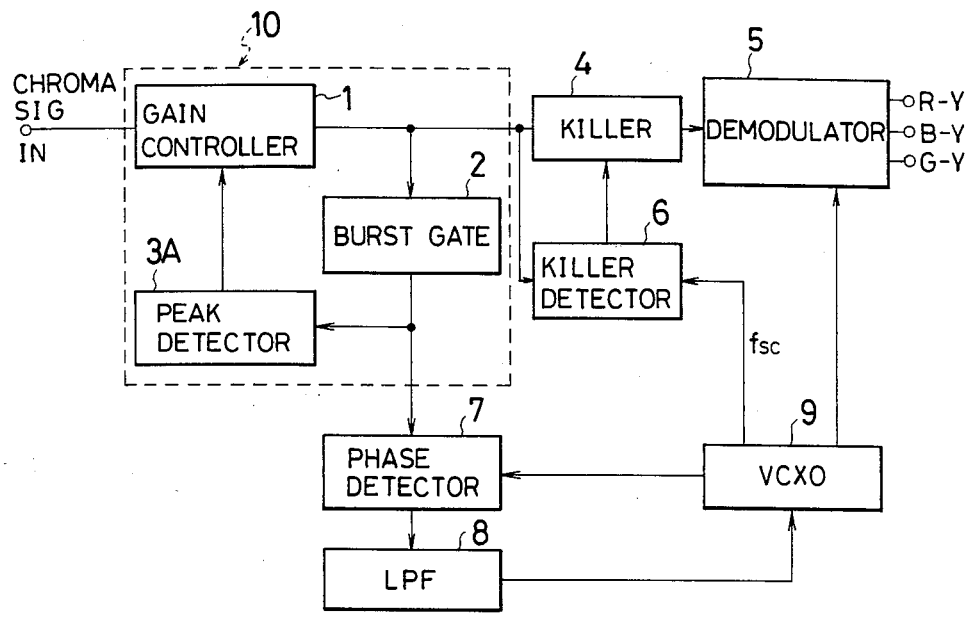
FIG. I(B)
(PRIOR ART)
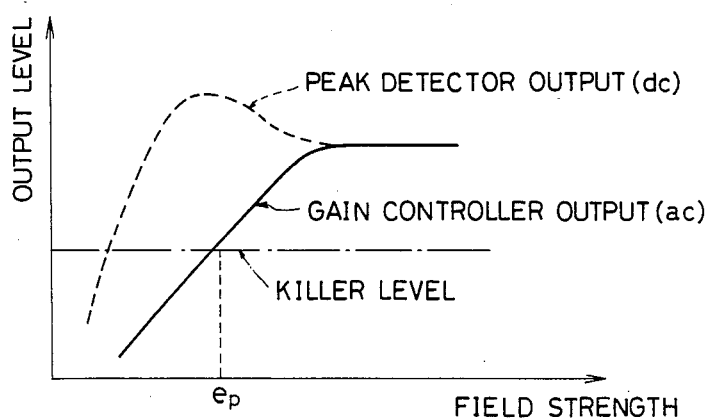

AUTOMATIC COLOR SATURATION CONTROLLER

BACKGROUND OF THE INVENTION

1. Field of the Invention

The present invention relates to an automatic color saturation controller incorporated with a color demodulator for a color TV set, and more specifically to an automatic color saturation controller for simultaneously providing a higher killer sensitivity and a higher chrominance signal quality.

2. Description of the Prior Art

In a color TV set, an automatic color saturation controller (referred to as ACC hereinafter) is incorporated to maintain the color saturation (an attribute representative of color density expressed by a mixture ratio of monochrome to achromatic color) of a reproduced color video signal at a constant level against the input level fluctuations of chrominance and luminance signals, by controlling the amplitude of the chrominance signal. Conventionally, a peak detector ACC and a synchronous detector ACC are both well known as the above ACCs. In the peak detector ACC, the peak value of color burst signal is detected to adjust a gain controller for the chrominance signal. In the synchronous detector ACC, the color burst signal is detected in synchronism with the reference chrominance subcarrier to adjust a gain controller for the chrominance signal.

In the case of the peak detector ACC, however, there exists a problem in that the output of the gain controller is excessively reduced when field strength is weak and therefore the S/N ratio of the color burst signal is lowered, so that a color killer circuit is erroneously activated to change the color TV broadcasting to a monochrome TV broadcasting (because the absence of color burst is detected), that is, the killer sensitivity is degraded at a weak field strength.

On the other hand, in the case of the synchronous detector ACC, there exists another problem such that when field strength is strong and further the S/N ratio of the color burst signal is lowered, it is difficult to stably maintain the amplitude of the chrominance signal at a constant level, because the color burst signal is detected without being subjected to the influence of noise included in the burst signal, so that the chrominance signal stability is degraded at a strong field strength.

The characteristics of the peak and synchronous detector ACCs will be described in greater detail hereinafter with reference to the attached drawings under DETAILED DESCRIPTION OF THE PREFERRED EMBODIMENT.

SUMMARY OF THE INVENTION

With these problems in mind, therefore, it is the primary object of the present invention to provide an automatic color saturation controller having a high killer sensitivity and a high chrominance signal stability over a wide field strength.

To achieve the above-mentioned object, the automatic color saturation controller according to the present invention comprises:

(a) first automatic color saturation control means responsive to a chrominance signal including a color burst signal, for synchronous-detecting a product signal of a reference chrominance subcarrier and the color burst signal to obtain a constant level chrominance signal on the basis of the synchronous-detected product signal, and applying only the color burst signal to a color killer circuit to activate the color killed circuit when the applied color burst signal drops below a predetermined color killer level;

(b) second autmtic color saturation control means also responsive to the same chrominance signal including the color burst signal, for peak-detecting the color burst signal to obtain another constant level chrominance signal on the basis of the peak-detected color burst signal; and (c) chrominance signal gate means responsive to said second automatic color saturation control means, for extracting only the chrominance signal to supply the extracted chrominance signal to a chrominance signal demodulator.

The gist of the controller according to the present invention results from the following facts: an automatic color saturation controller (ACC) of peak detector type provides a high chrominance signal stability at higher field strength but a low killer sensitivity at lower field strength because the chrominance signal gain is directly subjected to the influence of color burst noise; while an ACC of synchronous detector type provides a higher killer sensitivity at lower field strength but a low chrominance signal stability at higher field strength because the chrominance signal gain is controlled without being subjected to the influence of color burst noise.

That is, in order to make the best of these two types of 4CCs, the ACC according to the present invention comprises a first synchronous-detector ACC for outputting a color killer signal to a killer circuit and a second peak-detector ACC for outputting the chrominance signal to a demodulator.

The first automatic color saturation control means comprises a gain controller, a burst gate and a synchronous detector. The second automatic color saturation control means comprises a gain controller, a burst gate, and a peak detector.

Further, it is possible to obtain a constant-amplitude chrominance signal including the color burst signal by further providing an adder connected to the burst gate of the first ACC and the chrominance signal gate means conected to the second ACC.

BRIEF DESCRIPTION OF THE DRAWINGS

The features and advantages of an automatic color saturation controller according to the present invention will be more clearly appreciated from the following description of the preferred embodiment of the invention taken in conjunction with the accompanying drawings in which like reference numerals designate the same or similar elements or sections throughout the figures thereof and in which:

FIG. 1(A) is a schematic block diagram showing a prior art automatic color saturation controller of peak detector type, together with a color killer circuit, a chrominance signal demodulator, etc.;

FIG. 1(B) is a graphical representation showing an exemplary relationship between peak detector output, gain controller output and electromagnetic field strength in the automatic color saturation controller shown in FIG. 1(A);

DETAILED DESCRIPTION OF THE PREFERRED EMBODIMENT

Figure 2A:
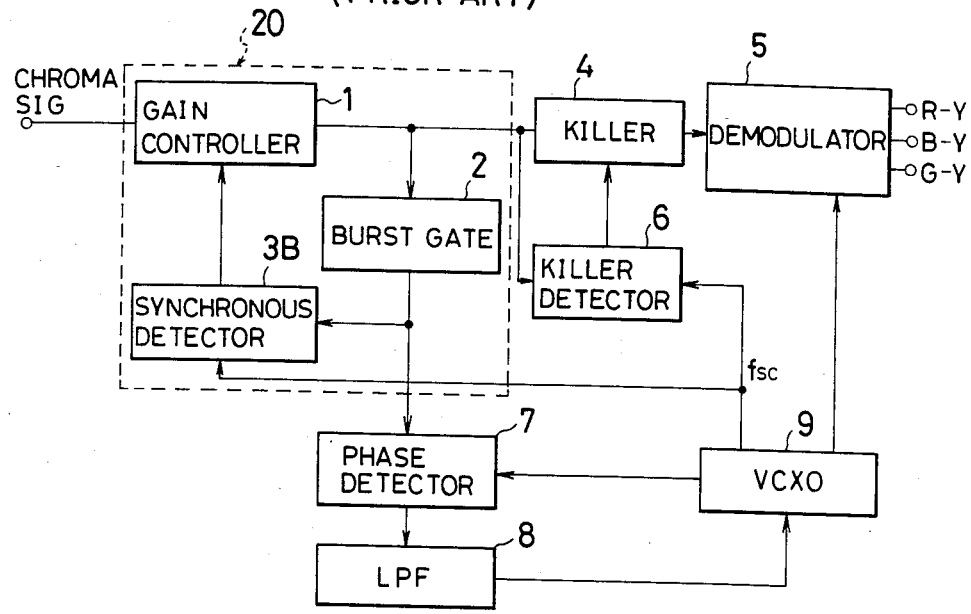
FIG. 2(A) is a schematic block iagram showing a prior art automatic color saturation controller of synchronous detector type, together with a color killer circuit, a chrominance signal demodulator, etc.

To facilitate understanding of the present invention, a reference will be made to prior art automatic color saturation controllers, with reference to the attached drawings.

FIG. 1(A) shows an automatic color saturation controller (ACC) 10 of peak detector type, which is connected to a chrominance signal demodulator 5 through a color killer circuit 4. The peak detector ACC 10 includes a gain controller 1, a peak detector 3A and a burst gate 2. The gain controller 1 serves to keep the amplitude of chrominance signal (CHROMA SIG) (including color difference signals and a color burst signal) applied to an input terminal IN thereof, before the chrominance signal is applied to the chrominance signal demodulator 5 via the color killer circuit 4. In more detail, the burst gate 2 separates a color burst signal added to the chrominance signal from the chrominance signal supplied from the gain controller 1. The peak detector 3A detects the peak value of the separated burst signal by half-wave or full-wave rectifying the burst signal to obtain a dc peak detector output. The gain controller 1 controls an amplification gain of the chrominance signal in such a way that the amplitude of the chrominance signal can be kept at a constant level on the basis of the dc peak detector output supplied from the peak detector 3A.

As described above, in the peak detector ACC, since the amplitude of the chrominance signal is kept at a constant level on the basis of the dc peak detector output representative of the peak values of the color burst signal, it is possible to stably control the amplitude of the chrominance signal at a constant level in a higher reliability. However, in case the field strength of TV electromagnetic waves decreases and therefore the S/N ratio of the chrominance signal is lowered, the dc peak detector output increases irregularly as shown in FIG. 1(B), so that the gain of the gain controller 1 decreased excessively and thereby the gain controller output also drops sharply as shown in FIG. 1(B). In this ACC, although the noise components of the chrominance signal are sufficiently suppressed at high field strength, since the gain controller output applied to a color killer detector 6 drops below a predetermined color killer level at a relatively high field strength $e_p$ as shown in FIG. 1(B), the color killer detector 6 erroneously activates the color killer circuit 4 so that the chrominance signal is killed below a relatively high field strength $e_p$. As a result, there exists a problem such that a color TV broadcasting is regarded as a monochrome TV broadcasting when the field strength is not sufficiently high. In other words, the color killer sensitivity of the ACC is degraded.

Further, in FIG. 1(A), the numeral 7 denotes a burst phase detector; 8 denotes a low-pass filter; and 9 denotes a voltage controled crystal oscillator 9. By means of these elements and in response to the color burst signal supplied from the burst gate 2, a chrominance subcarrier having the same frequency and the same phase as those on the transmitter side is generated from the voltage controlled crystal oscillator 9 to demodulate the chrominance signal into three color difference signals R−Y, B−Y and G−Y (y;luminance) through the demodulator 5. The more detailed description of the color reproduction operations will be omitted herein, because these are well known and not directly related to the gist of the present invention.

FIG. 2(A) shows an automatic color saturation controller of synchronous detector type, which is connected to the chrominance signal demodulator 5 through the color killer circuit 4.

Similarly, the synchronous detector ACC 20 includes the gain controller 1, a synchronous detector 3B and the burst gate 2. The function of this ACC is almost the same as that shown inFIG. 1(A).

In this ACC, being different from the peak detector 3A, the synchronous detector 3B detects the peak value of the extracted burst signal by synchronous-detecting the color burst signal to obtain a dc synchronous detector output.

In synchronous detection, a product signal of a reference chrominance subcarrier and a color burst signal is synchronous-detected. That is, the color burst signal and the chrominance subcarrier signal $f_{sc}$ (e.g. 3.58 MHz) in phase with the color burst signal are both applied to a product circuit (e.g. differential amplifier) in such a way that the burst signal is intermitted in synchronism with the chrominance subcarrier to fullwave rectify the burst signal while cancelling noise components. The feature of this synchronous detector is that it is possible to maintain a high detection efficiency even when the signal is weak in voltage level without producing distortion and without being subjected to the influence of noise.

Figure 2B:
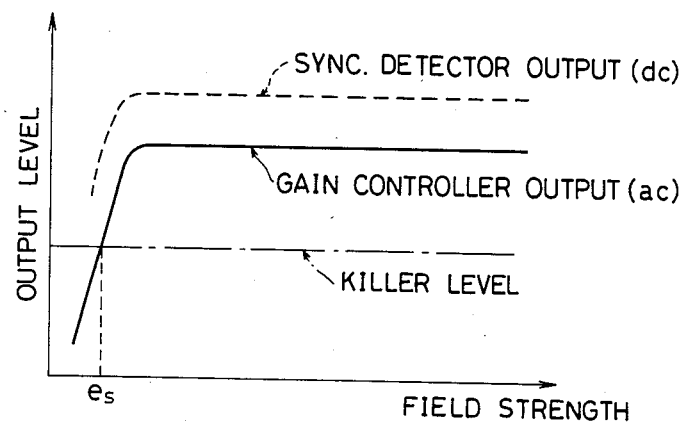
FIG. 2(B) is a graphical representation showing an examplary relationship between synchronous detector output, gain controller output and electromagnetic field strength in the automatic color saturation controller shown in FIG. 2(A)

As described above, in the synchronous detector ACC, since the amplitude of the chrominance signal is kept at a constant level on the basis of a dc synchrous detector output representative of peak values of the color burst signal over a wide field strength without being subject to the influence of noise, in case the field strength of TV electric waves decreases, the dc synchronous detector output decreases gradually aa shown in FIG. 2 (B), so that the gain of the gain controller 1 decreases in proportion to the voltage level of the dc synchronous detector output. In this synchronous ACC, when the gain controller output applied to the color killer detector 6 drops below a predetermined color killer level at a relatively low field strength $e_s$ as shown in FIG. 2 (B), the color killer detector 6 appropriately activates the color killer circuit 4 so that the chrominance signal is killed on the basis of a relatively high killer sensitivity. However, there still exists a problem in that when noise components increase in the color burst signal, it is impossible to keep the amplitude of the chrominance signal at a constant level, thus degrading the stability of chrominance signal, because the chrominance signal gain is controlled without being subjected to the influence of color burst noise.

In summary, in the peak detector ACC, since the noise level of the chrominance signal is appropriately suppressed at a relatively high field strength when the noise level is high, a high stable chrominance signal can be obtained. However, since the gain controller output decreases excessively at a relatively low field strength, the color killer circuit is activated at a relatively high field strength. That is, the peak detector ACC provides a high chrominance signal stability at high field strength but a low color killer sensitivity at low field strength.

On the other hand, in the synchronous detector ACC, since the gain of the color burst signal is controlled without being subjected to the influence of color burst signal noise, the color killer circuit is appropriately activated at a low field strength even if the noise level is high at low field strength, it is possible to prevent the color killer circuit from being activated erroneously. However, since the gain of the chrominance signal is controlled without being subjected to the influence of noise, it is impossible to sufficiently suppress the noise level of the chrominance signal when the noise level is high. That is, the synchronous detector provides a high color killer sensitivity at low field strength but a low chrominance signal stability at high field strength.

In view of the above description, reference is now made to an embodiment of the automatic color saturation controller according to the present invention. The feature of this invention is to provide a peak detector ACC to obtain a chrominance signal and to provide a synchronous detector ACC to obtain a killer signal under consideration of the features of these two ACCs.

Figure 3:
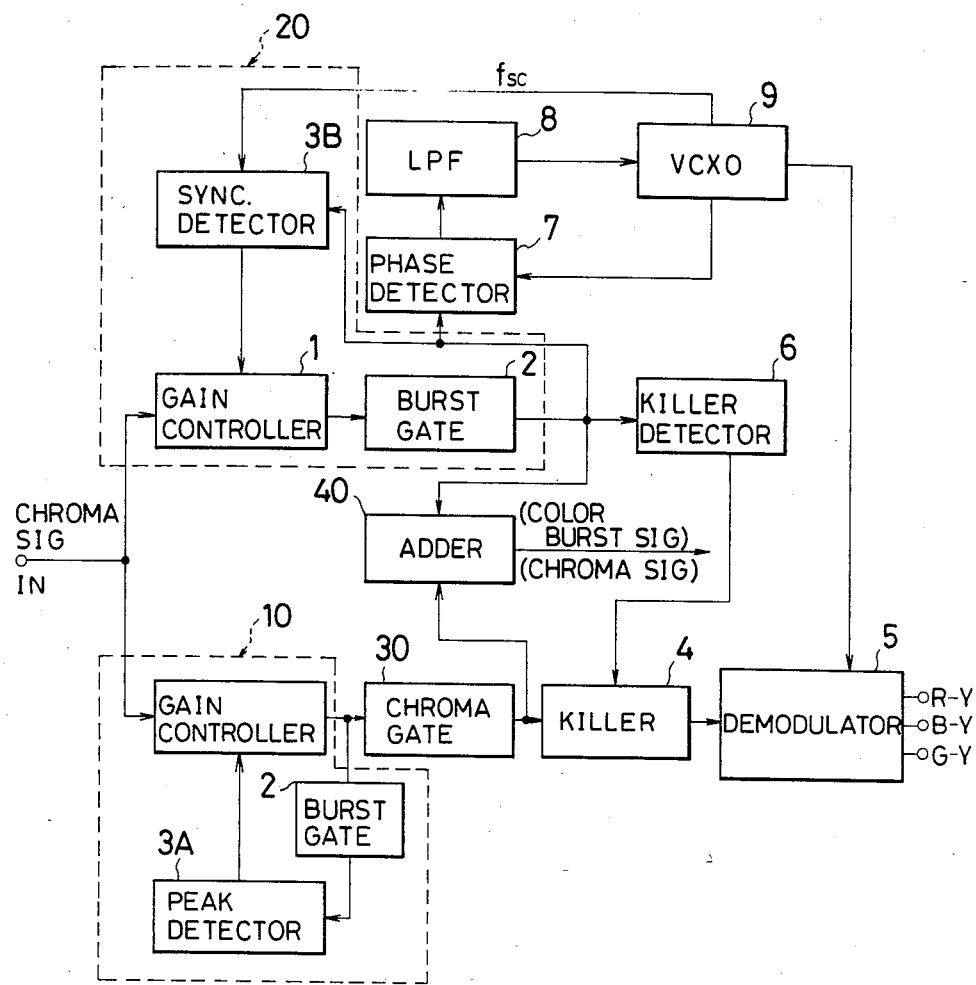
FIG. 3 is a schematic block diagram showing an automatic color saturation controller according to the present invention, together with a color killer circuit, a chrominance signal demodulator, etc.

With reference to FIG. 3, the automatic color saturation controller (ACC) according to the present invention comprises the peak detector ACC 10, the synchronous detector ACC 20, a chrominance signal gate 30 and an adder 40 where necessary. The chrominance signal whose gain is controlled by the peak detector ACC 10 is extracted through the chrominance signal gate 30 and then applied to the chrominance signal demodulator 5 via the killer circuit 4. The color burst signal whose gain is controlled by the synchronous detector ACC 20 is extracted through the burst signal gate 2 and then applied to the color killer detector 6 to activate the color killer circuit 4 when the gain controller output drops below a color killer level at a low field strength $e_s$.

The adder 40 outputs an original signal including both the chrominance signal supplied from the chrominance signal gate 30 and the color burst signal supplied from the burst signal gate 2, as in the prior art ACC shown in FIGS. 1A or 1B, where necessary.

In operation, when a chrominance signal including a color burst signal is applied to an input terminal IN, the chrominance signal is given to the peak detector ACC 10 and the synchronous detector ACC 20. The gain of the chrominance signal applied to the peak detector ACC 10 is controlled in response to a dc peak detector output obtained through the peak detector 3A by rectifying the color burst signal, in order to suppress noise components of the chrominance signal and to maintain the amplitude of the chrominance signal at a constant level. This chrominance signal is given to the chrominance signal gate 30 to eliminate the color burst signal added to the chrominance signal, that is, to extract only the chrominance signal in which noise components are sufficiently suppressed. That is, a high stable chrominance signal is supplied to the chrominance signal demodulator 5 via the killer circuit 4.

On the other hand, the gain of the chrominance signal applied to the synchronous detector ACC 20 is controlled in response to a dc synchronous detector output obtained through the synchronous detector 3B by synchronous-detecting the color burst signal in order to obtain a killer signal. The constant amplitude chrominance signal is given to the color burst signal gate 2 to extract only the burst signal whose level decreases with decreasing field strength only at a low field strength range. That is, a high sensitivity color killer signal is applied to the color killer detector 6 to activate it.

As described above, in the automatic color saturation controller according to the present invention, since chrominance signal is gain-controlled by the peak detector ACC before being supplied to the chrominance signal demodulator, it is possible to supply a high-quality chrominance signal whose noise components are sufficiently suppressed even if the noise level is high. On the other hand, since chrominance signal is gain-controlled by the synchronous detector ACC before being supplied to the color killer detector, it is possible to supply a high-sensitivity killer signal without being subjected to noise.

What is claimed is:

1. An automatic color saturation controller connected to a demodulator via a color killer circuit, which comprises:
   (a) first automatic color saturation control means responsive to a chrominance signal including a color burst signal, for synchronous-detecting a product signal of a reference chrominance subcarrier and the color burst signal to produce a first constant level chrominance signal on the basis of the synchronous-detected product signal, and applying only the color burst signal to the color killer circuit to activate the color killer circuit when the applied color burst signal drops below a predetermined color killer level;
   (b) second automatic color saturation control means also responsive to said chrominance signal including said color burst signal, for peak-detecting the color burst signal to produce a second constant level chrominance signal on the basis of the peak-detected color burst signal; and
   (c) chrominance signal gate means responsive to said second constant level chrominance signal produced by said second automatic color saturation control means, for extracting only said chrominance signal from said second constant level chrominance signal and supplying the extracted chrominance signal to a chrominance signal demodulator.

2. The automatic color saturation controller as set forth in claim 1, which further comprises adder means for adding the color burst signal supplied from said first automatic color saturation control means of synchronous detector type and the chrominance signal supplied from said chrominance signal gate means to obtain a constant-amplitude chrominance signal including the color burst signal.

3. The automatic color saturation controller as set forth in claim 1, wherein said first automatic color saturation control means comprises:
   (a) a gain controller responsive to said chrominance signal including said color burst signal;
   (b) a burst gate responsive to said gain controller for extracting only the color burst signal from the chrominance signal; and
   (c) a synchronous detector responsive to said burst gate and said reference chrominance subcarrier, for synchronous-detecting said product signal of the color burst signal from said burst gate and the reference chrominance subcarrier to output a dc burst detection signal, said gain controller outputting said first constant level chrominance signal including the color burst signal to said burst gate on the basis of the outputted dc burst detection signal from said synchronous detector.

4. The automatic color saturation controller as set forth in claim 1, wherein said second automatic color saturation control means comprises:

(a) a gain controller responsive to said chrominance signal including said color burst signal;

(b) a burst gate responsive to said gain controller for extracting only the color burst signal from the chrominance signal; and (c) a peak detector responsive to said burst gate, for peak-detecting the color burst signal from said burst gate to output a dc burst detection signal, said gain controller outputting said second constant level chrominance signal including the color burst signal to said burst gate on the basis of the outputted dc burst detection signal from said peak detector.

* * * * *